United States Patent
Kim et al.

(10) Patent No.: US 12,111,635 B2
(45) Date of Patent: Oct. 8, 2024

(54) METHOD AND APPARATUS FOR CONTROLLING REACTOR IN REFORMER

(71) Applicant: SK Incheon Petrochem Co., Ltd., Incheon (KR)

(72) Inventors: Min Ho Kim, Incheon (KR); Jung Gon Kim, Incheon (KR); Chang Mook Kim, Incheon (KR); Jin Cheol Seo, Seongnam-si (KR); Ja Young Heo, Seongnam-si (KR)

(73) Assignee: SK Incheon Petrochem Co., Ltd., Incheon (KR)

( * ) Notice: Subject to any disclaimer, the term of this patent is extended or adjusted under 35 U.S.C. 154(b) by 351 days.

(21) Appl. No.: 17/732,711

(22) Filed: Apr. 29, 2022

(65) Prior Publication Data
US 2022/0350309 A1 Nov. 3, 2022

(30) Foreign Application Priority Data
Apr. 30, 2021 (KR) .................. 10-2021-0056213

(51) Int. Cl.
G05B 19/4155 (2006.01)
G06N 5/022 (2023.01)

(52) U.S. Cl.
CPC ......... *G05B 19/4155* (2013.01); *G06N 5/022* (2013.01); *G05B 2219/45076* (2013.01)

(58) Field of Classification Search
CPC .............................................. G05B 19/4155
See application file for complete search history.

(56) References Cited

U.S. PATENT DOCUMENTS 6,144,897 A * 11/2000 Selliers ................. G05B 11/32
700/266
2004/0241061 A1* 12/2004 Takai .................... F28D 7/0033
422/198

(Continued)

FOREIGN PATENT DOCUMENTS

CN 110066682 A * 7/2019 ............. C10G 35/24
CN 111899811 A * 6/2020
(Continued)

OTHER PUBLICATIONS

Serra et al, Model Predictive Control for Ethanol Steam Reformers with Membrane Separation, Jan. 26, 2017, International Journal of Hydrogen Energy, vol. 42, Issue 4, pp. 1-24 (Year: 2017).*

(Continued)

*Primary Examiner* — Suresh Suryawanshi
(74) *Attorney, Agent, or Firm* — The Webb Law Firm

(57) ABSTRACT

Disclosed are method and apparatus for controlling a reactor in a reformer including training a first prediction model for predicting properties of feed and a second prediction model for predicting properties of products; predicting the properties of feed being currently supplied to a reactor set in real time by allowing a first prediction unit including the trained first prediction model to receive a current operating condition of the reactor set; predicting the properties of products being produced in the reactor set in real time by allowing a second prediction unit including the trained second prediction model to receive the current operating condition and the predicted properties of feed; calculating amount of temperature fluctuation for each reactor as a control signal for controlling each of the reactors; and controlling an operating temperature of each of the reactors based on the calculated amount of temperature fluctuation.

14 Claims, 9 Drawing Sheets

(56) References Cited

U.S. PATENT DOCUMENTS

| | | | | |
|---|---|---|---|---|
| 2012/0277501 A1* | 11/2012 | Gajda | ............... | C10G 59/00 |
| | | | | 585/303 |
| 2019/0062649 A1* | 2/2019 | Weintrob | ............... | C10G 59/02 |
| 2022/0137611 A1* | 5/2022 | Naito | ............... | G06N 3/045 |
| | | | | 706/12 |

FOREIGN PATENT DOCUMENTS

| | | | |
|---|---|---|---|
| DE | 102021201296 A1 * | 8/2022 | ......... G05B 13/0265 |
| KR | 101975436 B1 | 5/2019 | |
| RU | 2749252 C1 * | 6/2021 | |

OTHER PUBLICATIONS

Wang et al, Prediction and evaluation of plasma arc reforming of naphthalene using a hybrid machine learning model, 2021, pp. 1-31 (Year: 2021).*

Tran et al, Real-time furnace balancing of steam methane reforming furnaces, Jun. 2018, Science Direct, vol. 134, pp. 1-40 (Year: 2018).*

* cited by examiner

FIG. 5(A) PREDICT CONTENT (%) OF AROMATICS IN PRODUCT

FIG. 5(B) PREDICT CONTENT (%) OF PARAFFIN IN PRODUCT

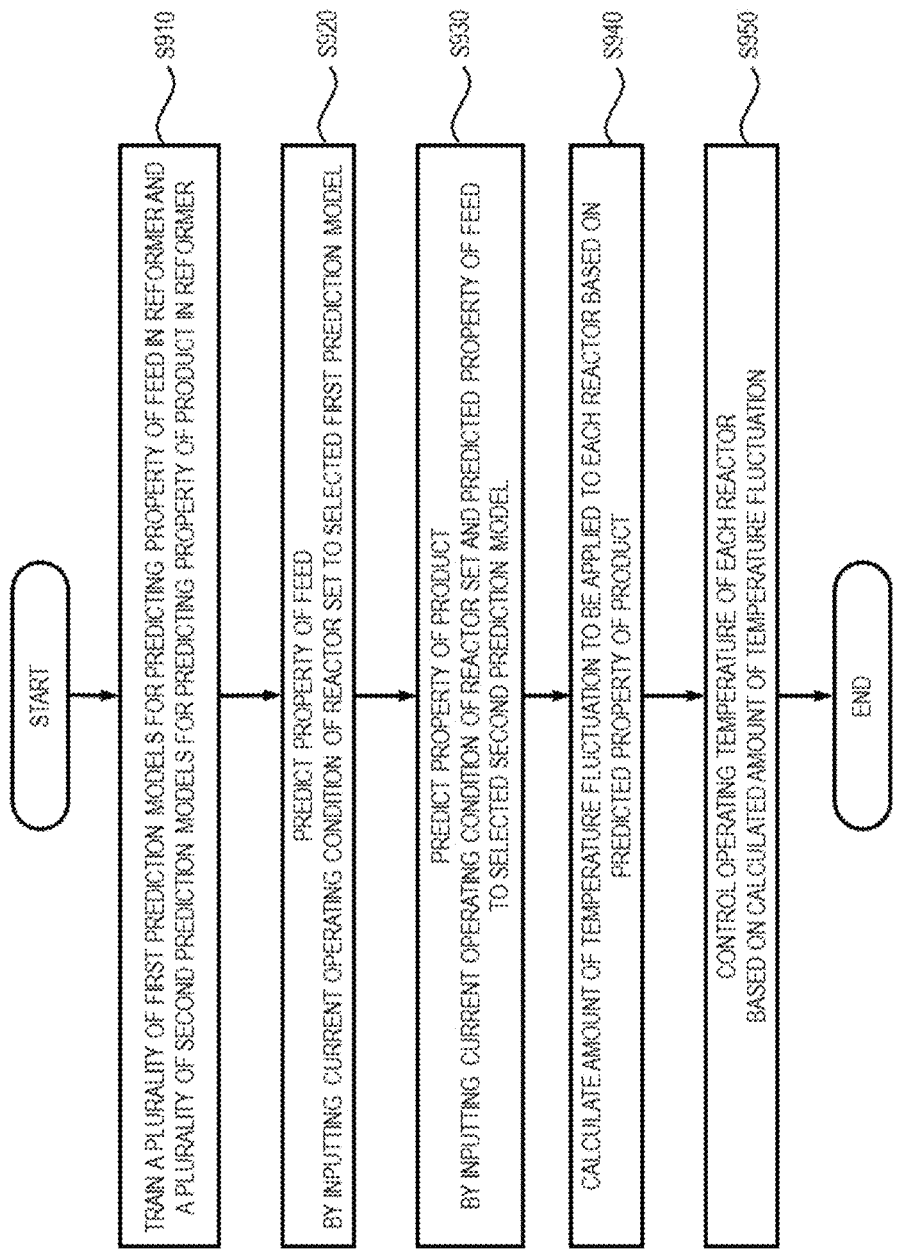

METHOD AND APPARATUS FOR CONTROLLING REACTOR IN REFORMER

CROSS-REFERENCE TO RELATED APPLICATION

This application claims priority to Korean Patent Application No. 10-2021-0056213 filed Apr. 30, 2021, the disclosure of which is hereby incorporated by reference in its entirety.

BACKGROUND OF THE INVENTION

1. Field of the Invention

The present disclosure relates to a method and apparatus for controlling a reactor in a reformer. More particularly, a method and apparatus for controlling a reactor in a reformer capable of predicting properties of feed and products in a reformer in real time and controlling an operation of the reactor based on the predicted properties of products are disclosed.

2. Description of Related Art

A first process of extracting oil from oil fields to produce crude oil and converting the produced crude oil into transportation fuels, heating fuels, feed for petrochemical products, etc., that we may use is called an oil refining process. The oil refining process is largely divided into three processes.

The oil refining process is performed by being divided into distillation which is a process that raises a temperature of crude oil, which is a mixture of various chemical components, and collects and separates components with similar physicochemical properties by using a difference in boiling points of each chemical component in the crude oil, refining which is a process that improves the quality of distillation products by removing impurities such as components that cause air pollution, such as sulfur, contained in the distilled intermediate products, and blending which is a process of mixing each refined intermediate product for each product or injecting additives.

A naphtha reforming process, which is one of the refining processes, is a process of producing aromatics rich reformate by using, as a feed, heavy naphtha from which sulfur, nitrogen, metals, etc., have been removed through a naphtha hydro-treating process (hydrodesulfurization process) and converting napthene and paraffin components contained in the heavy naphtha into an aromatic component.

The naphtha reformer in which the naphtha reforming process is made includes a plurality of reactors and a catalyst regeneration tower. The heavy naphtha, which is a feed, is injected into a first reactor together with a catalyst, and then sequentially passes through the remaining reactors. In each reactor, a reforming reaction in which the napthene and paraffin components contained in naphtha are converted into the aromatic components takes place. In this case, the degree of reaction in the reactor varies according to the content of each component contained in the feed and the temperature of the reactor, and as a result, the properties of products produced through the naphtha reforming process also vary.

However, the prior art measures operation data of a reactor once a day, and controls an operation of the reactor based on the measured operation data and an operator's experience. Therefore, the related art has a problem in that it is difficult to control the operation of the reactor in real time.

SUMMARY OF THE INVENTION

The present disclosure provides a method and apparatus for controlling a reactor in a reformer capable of predicting properties of feed and products in a reformer in real time so that an operator may confirm changes in the properties of products according to an operation temperature control of the reactor in real time, and controlling the operation of the reactor so that the content of aromatic components in the properties of products is maximized.

According to an aspect of the present disclosure, a method of controlling a reactor in a reformer includes training a first prediction model for predicting properties of feed in a reformer and a second prediction model for predicting properties of products in the reformer; predicting the properties of feed being currently supplied to the reactor in real time by allowing a first prediction unit including the trained first prediction model to receive a current operating condition of the reactor set in the reformer; predicting the properties of products being produced in the reactor set in real time by allowing a second prediction unit including the trained second prediction model to receive the current operating condition and the predicted properties of feed; calculating a temperature amount of change to be applied to each reactor as a control signal for controlling each of the reactors of the reactor set based on the predicted properties of products; and controlling an operating temperature of each of the reactors based on the calculated temperature amount of change.

The first prediction model may be trained by using, as training data, experimental values for the properties of feed supplied to the reactor set, and using the operating condition of the reactor set when a reforming reaction is performed using the feed.

The second prediction model may be trained by using, as training data, experimental values for the properties of feed supplied to the reactor set, the operating condition of the reactor set when a reforming reaction is performed using the feed, and experimental values for the properties of products produced in the reactor set.

The first prediction unit may predict a content of napthene and a content of paraffin contained in the feed being currently supplied to the reactor set, respectively.

The second prediction unit may predict a content of whole aromatics and a content of paraffin contained in the product being produced in the reactor set, respectively, and predict a content of each component of the whole aromatics. The current operating condition may include one or more of a feed flow rate, a circulating gas flow rate, hydrogen purity, an operating pressure, an operating temperature for each reactor, and inlet and outlet temperatures of each reactor that are supplied to the reactor set.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 4(A) is a graph showing a comparison of an experimental value and a predicted value for a content (%) of naphtha in a feed, and FIG. 4(B) is a graph showing a comparison of an experimental value and a predicted value for a content (%) of paraffin in the feed;

FIG. 5(A) is a graph showing a comparison of an experimental value and a predicted value for a content (%) of aromatics in a product, and FIG. 5(B) is a graph showing a comparison of an experimental value and a predicted value for a content (%) of paraffin in the product;

FIG. 9 is a flowchart illustrating a method of controlling a reactor in a reformer according to another embodiment of the present disclosure.

DESCRIPTION OF THE INVENTION

Figure 1:
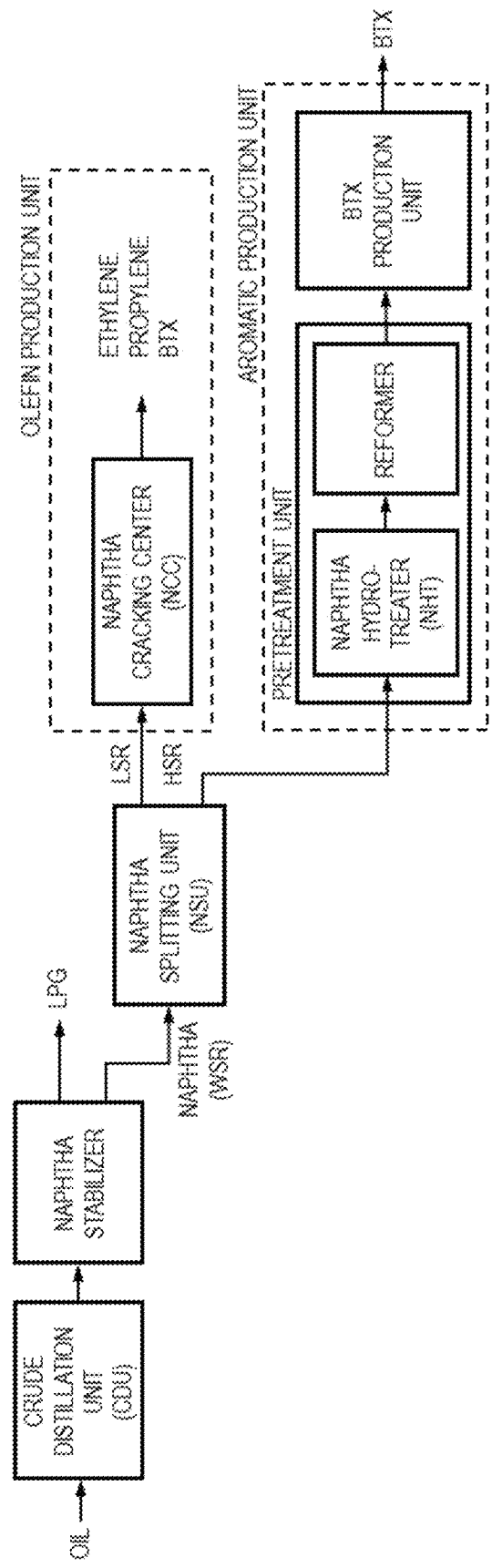
FIG. 1 is a diagram schematically illustrating an oil refinery facility.

Various advantages and features of the present disclosure and methods accomplishing them will become apparent from the following description of embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims.

Unless defined otherwise, all terms (including technical and scientific terms) used in the present specification have the same meaning as meanings commonly understood by those skilled in the art to which the present disclosure pertains. In addition, terms defined in commonly used dictionary are not ideally or excessively interpreted unless explicitly defined otherwise.

Terms used in the present specification are for describing embodiments rather than limiting the present disclosure. Unless otherwise stated, a singular form includes a plural form in the present specification. Throughout this specification, the term "comprises" and/or "comprising" will be understood to imply the inclusion of stated constituents but not the exclusion of any other constituents.

Hereinafter, exemplary embodiments of the present disclosure will be described with reference to the accompanying drawings. In the drawings, like reference numbers indicate like components.

FIG. 1 is a diagram schematically illustrating an oil refinery facility.

Referring to FIG. 1, the oil refinery facility includes a crude distillation unit (CDU), a naphtha stabilizer, a naphtha splitting unit (NSU), an olefin production unit, and an aromatic production unit.

The crude distillation unit is also called A-tower, A-column, topper, and topping column, and is a unit that separates crude oil into liquefied petroleum gas (LPG), naphtha, kerosene, diesel, and B-C oil according to a difference in boiling points. The LPG and naphtha correspond to light oil, the kerosene and diesel correspond to middle oil, and the B-C oil corresponds to heavy oil. This facility takes advantage of the fact that components constituting crude oil have different properties to evaporate into gas under constant pressure and temperature. The temperature and pressure inside the column are lowered toward an upper portion of the column to separate the mixed oil into separate oil. The crude distillation unit is called an atmospheric distillation column because it operates at normal pressure similar to atmospheric pressure.

An inside of the atmospheric distillation column includes about 40 to 50 stages, and crude oil heated to about 350° C. by a heat exchanger and a heater is put into the inside of the atmospheric distillation column. Each stage is divided into trays installed at about every 1 m high. Each tray is made of an iron plate in a cap form (bubble cap tray) having a structure that is easy to generate bubbles, a form in which small holes are drilled in the iron plate, or a form (valve tray) in which a valve is installed on the iron plate, and is thus designed to facilitate gas-liquid equilibrium by ensuring that a liquid component that condenses and descends from the upper stage and a gaseous component that vaporizes and ascends from a lower stage come into contact with each other smoothly.

The naphtha stabilizer refers to a distillation column that separates only naphtha by removing gas oils (LPG and fuel gas) from naphtha oil recovered from the highest stage of the atmospheric distillation column.

The naphtha splitting unit is a unit that separates naphtha (whole straight run naphtha, WSR) recovered from the naphtha stabilizer into light naphtha (light straight run naphtha, LSR) and heavy naphtha (heavy straight run naphtha, HSR).

The olefin production unit is a unit that produces basic oils, such as ethylene, propylene, and benzene, toluene, xylene (BTX), using the light naphtha as a feed. The olefin production unit includes a naphtha cracking center (NCC).

The aromatic production unit is a unit that produces aromatics, such as benzene, toluene, para-xylene, using the heavy naphtha as a feed. The aromatic production unit includes a pretreatment unit and a BTX production unit.

The pretreatment unit includes a naphtha hydro-treater (NHT) and a reformer.

The naphtha hydro-treater is a unit that removes sulfur (S), nitrogen (N), and metal present in the heavy naphtha as a feed and saturates olefin. The sulfur, nitrogen, and metal needs to be removed as they reduce the efficiency of a catalyst entering the reformer. The naphtha hydro-treater removes sulfur, nitrogen, and metals by adding hydrogen under high-temperature and high-pressure conditions and using the catalyst. The heavy naphtha from which the sulfur, nitrogen and metals have been removed through the naphtha hydro-treater is supplied to the reformer.

The reformer is a unit that converts a napthene component and a paraffin component present in the heavy naphtha into an aromatic component to produce an aromatics rich reformate. Examples of reforming methods may include thermal reforming in which heating is performed only at high temperatures without using a catalyst and catalytic reforming in which treatment is performed using a catalyst. In the following description, a catalytic reforming method using a catalyst will be described as an example.

Figure 2:
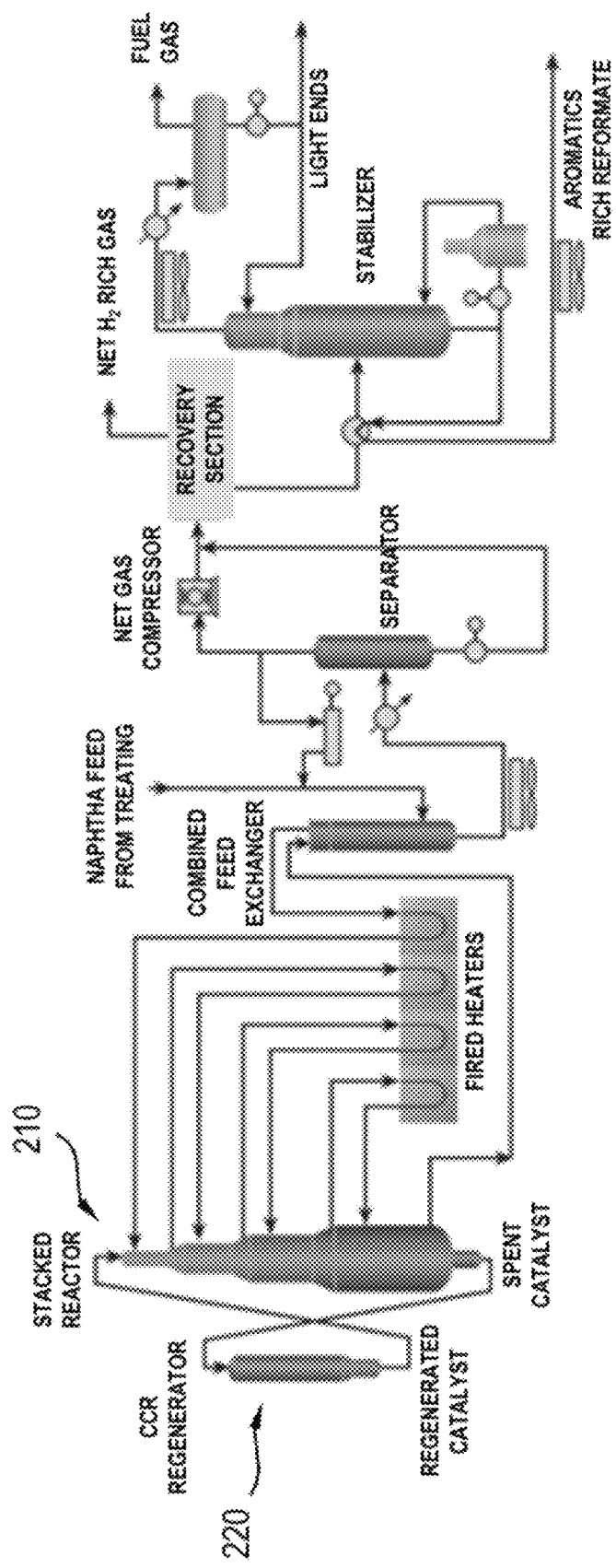
FIG. 2 is a diagram illustrating a reformer illustrated in FIG. 1.

FIG. 2 is a diagram schematically illustrating the reformer illustrated in FIG. 1.

Referring to FIG. 2, the reformer is configured to include a reactor set 210 including a plurality of reactors, a catalyst regeneration tower 220 and a stabilizer.

The heavy naphtha treated by the naphtha hydro-treater and circulating gas containing a large amount of hydrogen is heated to about 520° C. and pressurized to 4 atmospheric pressures while passing through the feed exchanger and the heater, and then passes through four reactors in turn. In this case, the catalyst moves together with reactants in the reactor set 210. Oil from the reactor set 210 is separated into a gas containing a large amount of hydrogen and liquid phase through a separator. The separated gas is circulated again through the stabilizer, and a surplus gas is sent to a process using hydrogen.

As such, the reformer produces the aromatics rich reformate by using the heavy naphtha treated by the naphtha hydro-treater as a feed. Since the reforming reaction performed in the reactor set 210 has the characteristics of an endothermic reaction, the higher the temperature of the reactor set 210, the better the reaction occurs. In addition, the degree of reaction in each reactor varies according to the properties of feed supplied to the reactor set 210, and the degree of reaction in each reactor may be determined based on a difference in temperature between front and rear ends of each reactor.

Therefore, when a first prediction model for predicting properties of feed according to a current operating of the reformer and a second prediction model for predicting properties of products according to the current operating conditions of the reformer are created by analyzing data such as experimental values for the properties of feed, operating conditions (e.g., a feed flow rate, a circulating gas flow rate, hydrogen purity, an operating pressure, an operating temperature for each reactor, and inlet and outlet temperatures of each reactor) of the reactor set 210 when the reforming process is performed using the feed, and experimental values for the properties of products, it is possible to predict each of the properties of feed and products according to the current operating conditions of the reformer in real time through these prediction models. In addition, it is possible to control the operating conditions of each reactor in real time based on the predicted properties of products so that a content of the aromatic component in the product may be maximized.

According to the embodiment, the first prediction model is trained by using, as training data, the experimental values for the properties of feed, the operating conditions of the reactor set when the reforming reaction is performed using the feed. Here, as the experimental values for the properties of feed, the content of napthene and the content of paraffin contained in the feed may be exemplified. The experimental values for the content of naphtha and the content of paraffin contained in the feed may be obtained by collecting a sample of feed and then analyzing the sample. Examples of the operating conditions of the reactor set may include the feed flow rate, the circulating gas flow rate, the hydrogen purity, the operating pressure, the operating temperature for each reactor (internal temperature for each reactor), the inlet and outlet temperatures of each reactor, and a weighted average inlet temperature (WAIT) of the reactor.

The trained first prediction model receives the current operating conditions of the reactor set as input variables, and outputs prediction results of the content of napthene and the content of paraffin in the feed as output variables, respectively.

According to the embodiment, the second prediction model is trained by using, as the training data, the experimental values (e.g., experimental values for the content of napthene and the content of paraffin in the feed, respectively) for the properties of feed, the operating conditions (e.g., the feed flow rate, the circulating gas flow rate, the hydrogen purity, the operating pressure, the operating temperature for each reactor, inlet temperature and outlet temperature of each reactor, and the weighted average inlet temperature of the reactor) of the reactor set when the reforming reaction is performed using the feed, and the experimental values for the properties of product produced in the reactor set. Here, examples of the experimental values for the properties of product may include the content of aromatics and the content of paraffin in the product. In addition, the content of aromatics in the product may be subdivided into a content of aromatic C6, a content of aromatic C7, a content of aromatic C8 content and a content of aromatic C9 in a product. The experimental value for the content of aromatics in the product and the experimental value for the content of paraffin in the product may be obtained by collecting the sample of the product and then analyzing the collected sample.

The trained second prediction model receives the current operating conditions of the reactor set and the prediction results of the properties of feed of the first prediction model as the input variables, and outputs the prediction results of the content of aromatic and the content of paraffin in the product as the output variables, respectively. In this way, the second prediction model not only outputs the prediction results of the content of whole aromatics in the product, but also outputs the prediction results of the results of each of the content of aromatic C6, the content of aromatic C7, the content of aromatic C8, and the content of aromatic C9 among the whole aromatics.

Figure 3:
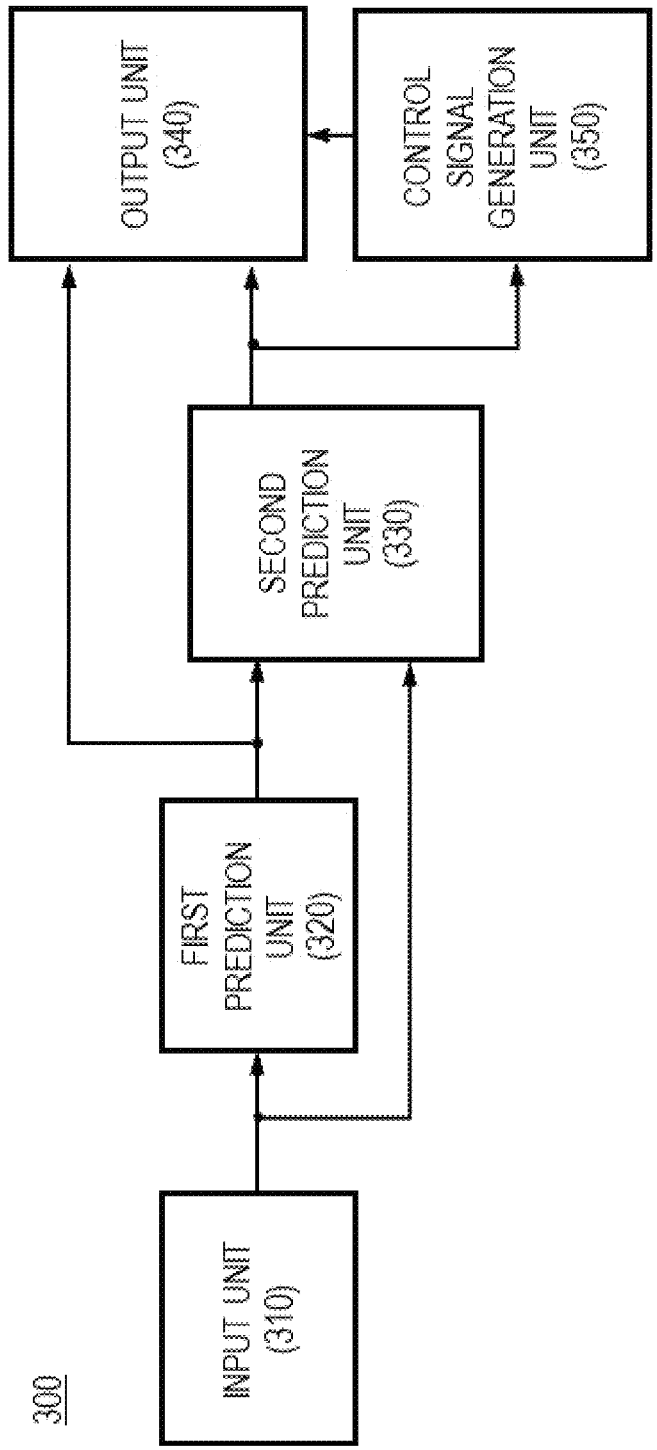
FIG. 3 is a diagram illustrating a configuration of an apparatus of controlling a reactor in a reformer according to an embodiment of the present disclosure.

FIG. 3 is a diagram illustrating a configuration of an apparatus 300 for controlling a reactor in a reformer (hereinafter, referred to as "reactor control apparatus") according to an embodiment of the present disclosure.

Referring to FIG. 3, the reactor control apparatus 300 includes an input unit 310, a first prediction unit 320, a second prediction unit 330, an output unit 340, and a control signal generation unit 350.

The input unit 310 receives various types of information and/or commands from an operator. For example, the current operating conditions of the reactor set 210 are received. Examples of the operating conditions of the reactor set 210 may include the feed flow rate, the circulating gas flow rate, the hydrogen purity, the operating pressure, the operating temperature for each reactor (internal temperature for each reactor), the inlet and outlet temperatures of each reactor, and the weighted average inlet temperature of the reactor. As exemplified, the operating conditions may be those detected by sensors disposed for each component of the reformer, or may be those directly input by an operator. As another example, the input unit 310 receives an operating condition change command. Specifically, the input unit 310 receives a command for changing the weighted average inlet temperature of the reactor or a command for changing the inlet temperature of each reactor. These commands may be input by the operator.

In order to receive such information and/or commands, the input unit 310 includes an input means such as a keypad, a touch pad, or a touch panel. The touch panel includes a resistive touch panel, a capacitive touch panel, an ultrasonic touch panel, or an infrared touch panel. Such a touch panel is stacked on a display (not illustrated) of the output unit 340 to be described later to constitute a touch screen.

Figure 4:
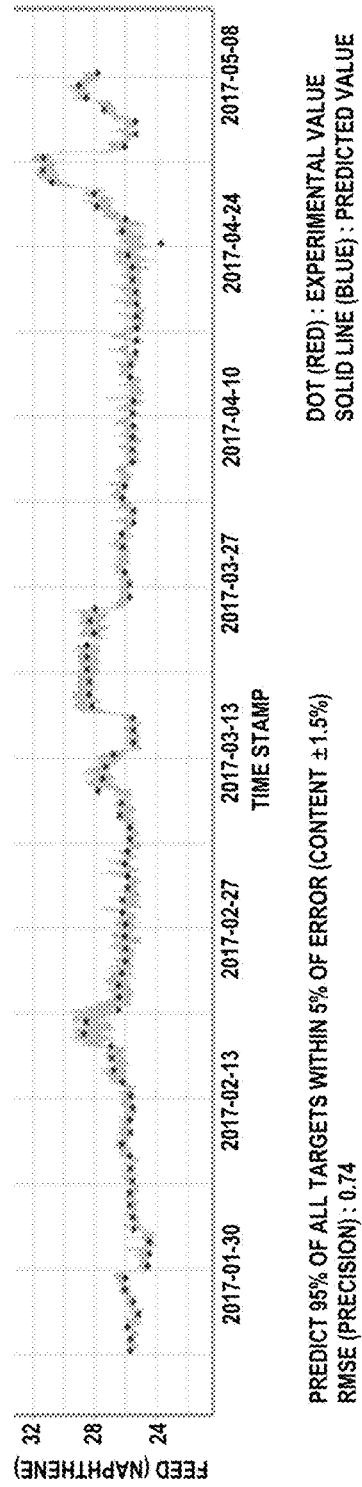
FIG. 4 illustrates an example of a prediction result by a first prediction unit illustrated in FIG. 3.
Figure 4:
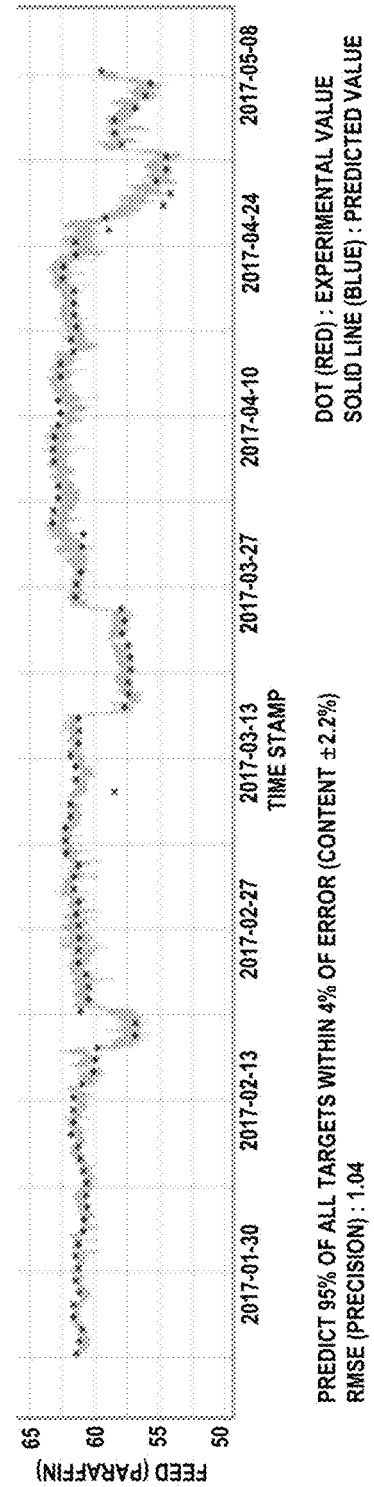

The first prediction unit 320 predicts the properties of feed being supplied to the reactor set in real time based on the current operating conditions of the reactor set input through the input unit 310. To this end, the first prediction unit 320 may use the pre-trained first prediction model as described above. The prediction results predicted through the first prediction model are as illustrated in FIG. 4.

FIG. 4(A) is a graph showing the comparison of the experimental value and the predicted value for the content (%) of naphtha in the feed. In the graph illustrated in FIG. 4(A), a horizontal axis represents time, and a vertical axis represents the content of naphtha in the feed. A blue solid line represents the predicted value for the content of napthene in the feed, and a red dot represents the experimental value for the content of napthene in the feed.

Referring to FIG. 4(A), it may be seen that the experimental value for the content of napthene in the feed is obtained once a day, whereas the predicted value is continuously obtained over time. In addition, it may be seen that it is possible to predict 95% of all targets within 5% of error (content±1.5%). In addition, it may be seen that a root mean square error (RMSE) for the output variable "the content of naphtha in the feed" is 0.74.

FIG. 4(B) is a graph showing the comparison of an experimental value and a predicted value for the content (%) of paraffin in the feed. In the graph illustrated in FIG. 4(B), a horizontal axis represents time, and a vertical axis represents the content of paraffin in the feed. A blue solid line represents the predicted value for the content of paraffin in the feed, and a red dot represents the experimental value for the content of paraffin in the feed.

Referring to FIG. 4(B), it may be seen that the experimental value for the content of paraffin in the feed is obtained once a day, whereas the predicted value is continuously obtained over time. In addition, it may be seen that it is possible to predict 95% of all targets within 4% of error (content±2.2%). In addition, it may be seen that the root mean square error of the output variable "the content of paraffin in the feed" is 1.04.

The root mean square error is obtained by dividing the sum of the squares of the value obtained by subtracting the experimental value from the predicted value by the number of samples. In other words, the root mean square error is a measure indicating the difference between the predicted value predicted by the first prediction unit 320 and the measured value measured in the real environment. The root mean square error is suitable for representing precision, and it may be understood that the smaller the root mean square error, the higher the precision.

Referring to FIG. 4, it may be seen that the root mean square error for the output variable "the content of napthene in the feed" has a smaller value than the root mean square error for the output variable called "the content of paraffin in the feed." It may be understood that the first prediction model of the first prediction unit 320 has higher precision with respect to the output variable "the content of napthene in the feed."

Referring back to FIG. 3, the second prediction unit 330 predicts properties of product being produced in the reactor set in real time based on the current operating conditions of the reactor set input through the input unit 310 and the prediction results of the first prediction unit 320, that is, the predicted properties of feed. To this end, the second prediction unit 330 may use the pre-trained second prediction model as described above. The prediction results predicted through the second prediction model are as illustrated in FIGS. 5 and 6.

Figure 5:
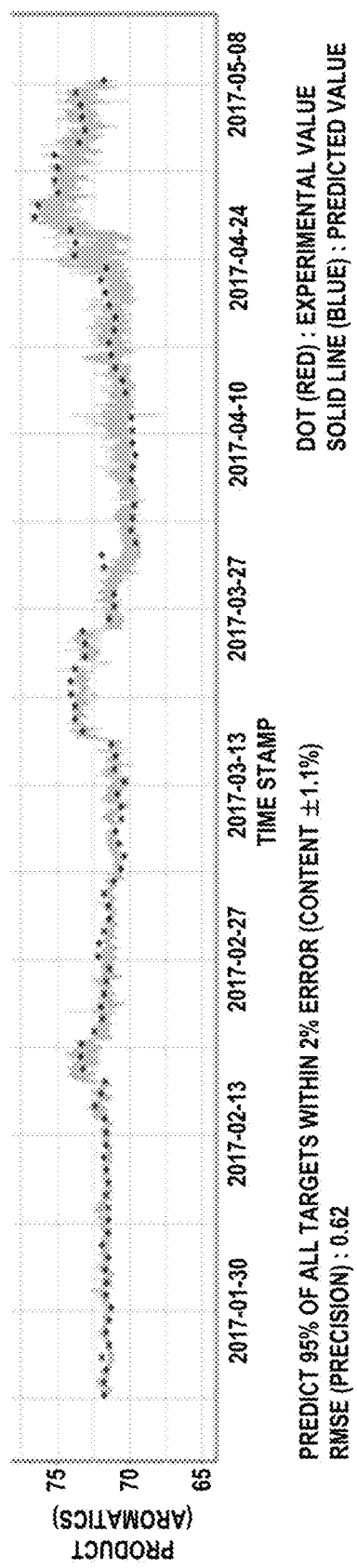
FIG. 5 illustrates a prediction result by a second prediction unit illustrated in FIG. 3.
Figure 5:
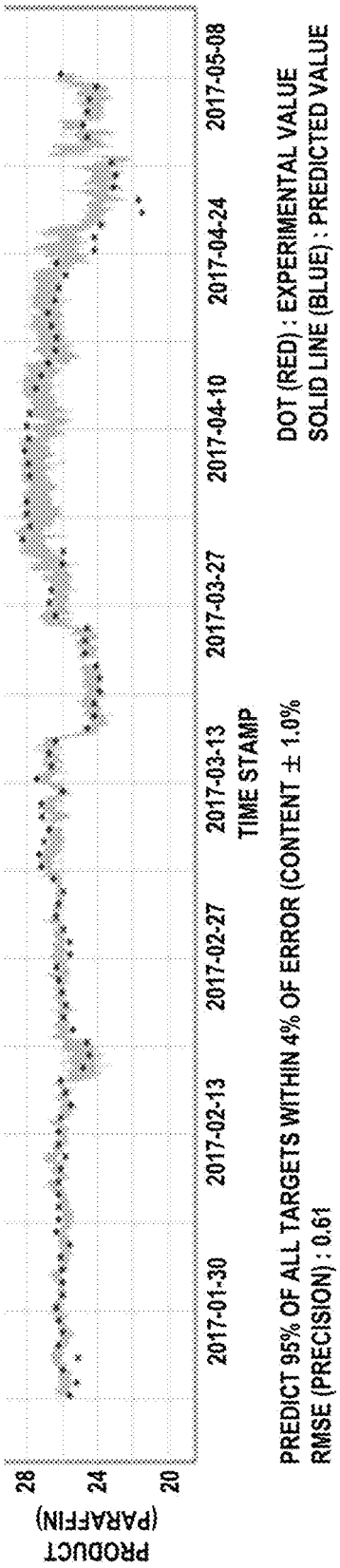
Figure 6:
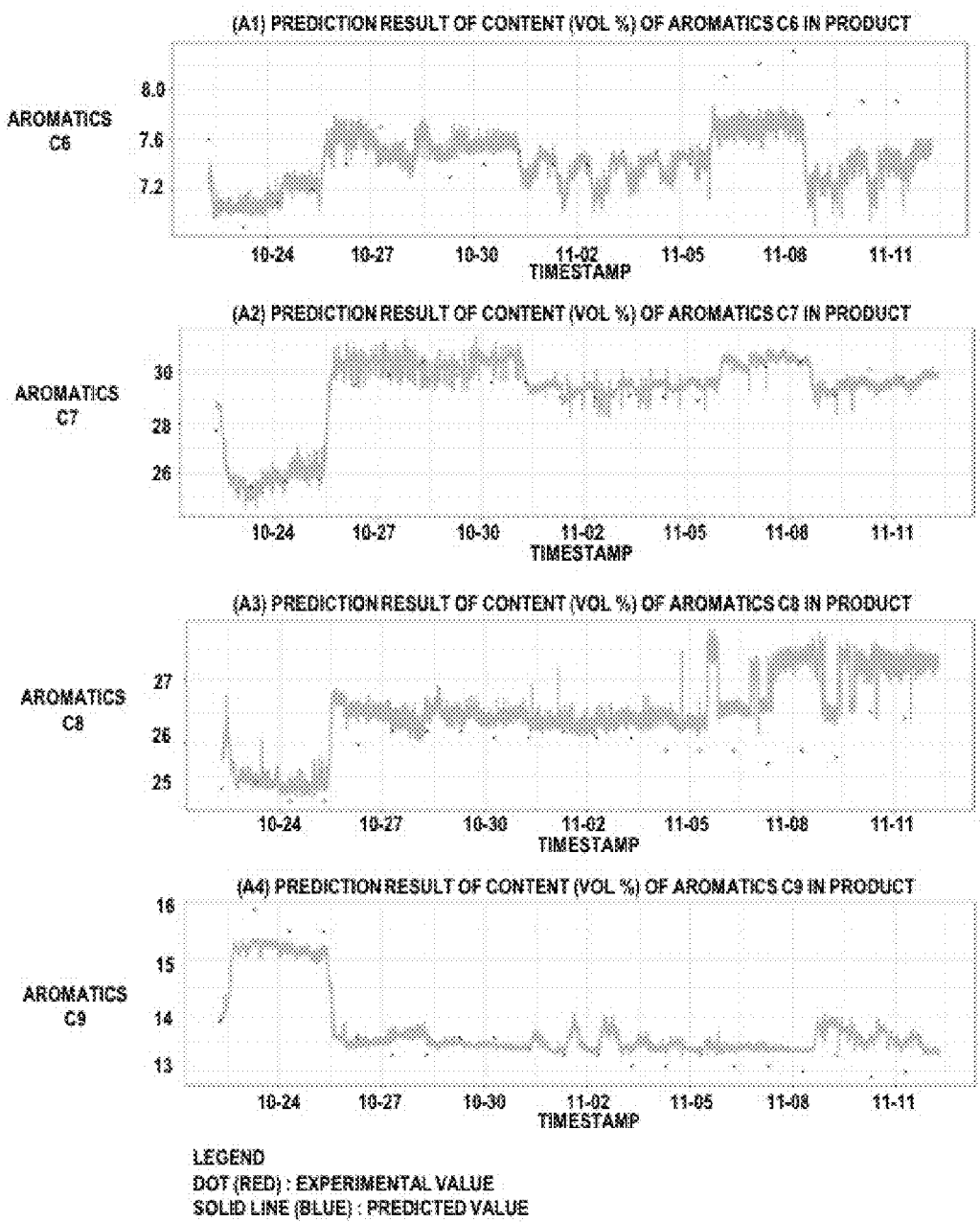
FIG. 6 is a diagram illustrating the experimental value and the predicted value for the content (vol %) of the aromatics in the product divided by each component.

FIG. 5 is a diagram illustrating the prediction results of the properties of product among the results predicted through the second prediction model.

FIG. 5(A) is a graph showing the comparison of the experimental value and the predicted value for the content (%) of aromatics in the product. In the graph illustrated in FIG. 5(A), a horizontal axis represents time, and a vertical axis represents the content of aromatics in the product. A blue solid line represents the predicted value for the content of aromatics in the product, and a red dot represents the experimental value for the content of aromatics in the product.

Referring to FIG. 5(A), it may be seen that the experimental value for the content of aromatics in the product is obtained once a day, whereas the predicted value is continuously obtained over time. In addition, it may be seen that it is possible to predict 95% of all targets within 2% of error (content±1.1%). In addition, it may be seen that the root mean square error of the output variable "the content of aromatics in the product" is 0.62.

FIG. 5(B) is a graph showing the comparison of the experimental value and the predicted value for the content (%) of paraffin in the product. In the graph illustrated in FIG. 5B, a horizontal axis represents time, and a vertical axis represents the content of paraffin in the product. A blue solid line represents the predicted value for the content of paraffin in the product, and a red dot represents the experimental value for the content of paraffin in the product.

Referring to FIG. 5(B), it may be seen that the experimental value for the content of paraffin in the product is obtained once a day, whereas the predicted value is continuously obtained over time. In addition, it may be seen that it is possible to predict 95% of all targets within 4% of error (content±1.0%). In addition, it may be seen that the root mean square error of the output variable "the content of paraffin in the product" is 0.61.

FIG. 6 illustrates the experimental value and the predicted value for the content of aromatics in the product divided by each component.

FIG. 6(A1) is a graph showing the comparison of the experimental value and the predicted value for the content of aromatic C6 in the product, and FIG. 6(A2) is a graph showing the comparison of the experimental value and the predicted value for the content of aromatic C7 in the product. FIG. 6(A3) is a graph showing the comparison of the experimental value and the predicted value for the content of aromatic C8 in the product, and FIG. 6(A4) is a graph showing the comparison of the experimental value and the predicted value for the content of aromatic C9 in the product.

It may be seen that, referring to FIGS. 6(A2) and 6(A4), the error between the measured value and the predicted value is small, whereas, referring to FIGS. 6(A1) and 6(A3), the error between the measured value and the predicted value is somewhat large. As such, when the error between the measured value and the predicted value exceeds a reference value, a tuning process for adjusting the performance of the second prediction model may be performed.

Referring back to FIG. 3, the output unit 340 outputs the command processing results and/or various data as at least one of a visual signal and an audio signal. For example, the output unit 340 outputs the prediction results of the first prediction unit 320 and/or the prediction results of the second prediction unit 330 as the visual signal and/or the audio signal. To this end, the output unit 340 includes a display (not illustrated) for outputting the visual signal and a speaker (not illustrated) for outputting the audio signal. The display may be provided in the form of a flat panel display, a flexible display, an opaque display, a transparent display, electronic paper (E-paper), or provided in any form well known in the art to which the present disclosure pertains.

When the prediction results of the first prediction unit 320 and/or the prediction results of the second prediction unit 330 are output through the output unit 340, the operator may directly input an operation change command for changing the operating conditions of the reactor set 210 or the operating conditions of each reactor through the input unit 310 by referring to the output prediction results. For example, when the predicted value for the content of aromatics in the product and the predicted value for the content of paraffin in the product among the prediction results of the second prediction unit 330 are displayed on the display, the operator may directly input the operating temperature to be applied to each reactor through the input unit 310 so that the content of aromatic components in the product may reach the reference value.

The control signal generation unit 350 generates each control signal for controlling the operating temperature of each reactor based on the prediction results of the properties of products by the second prediction unit 330, respectively.

For example, when the predicted value for the content of whole aromatics in the product is less than the reference value, the control signal generation unit 340 calculates how much the operating temperature of each reactor needs to be raised to make the content of whole aromatics in the product reach the reference value. That is, the amount of temperature fluctuation to be applied to each reactor is calculated.

As another example, when the content of specific aromatics in the product is less than the reference value, the control signal generation unit 340 calculates the amount of temperature fluctuation for each reactor required to make the content of the specific aromatic in the product reach the reference value. It may be set in advance by the operator whether to calculate the amount of temperature fluctuation for each reactor based on either the content of whole aromatics or the content of specific aromatics in the product.

On the other hand, when calculating the amount of temperature fluctuation to be applied to each reactor, the control signal generation unit 350 calculates the amount of temperature fluctuation to be applied to each reactor within the allowable range in consideration of the allowable temperature and coke generation amount of the catalyst regeneration tower in the reformer.

The calculated amount of temperature fluctuation may be directly applied to each reactor, or may be output through the output unit 340 before being applied to each reactor. In this case, the operator may select whether to apply the calculated amount of temperature fluctuation to each reactor after checking the output information.

Figure 7:
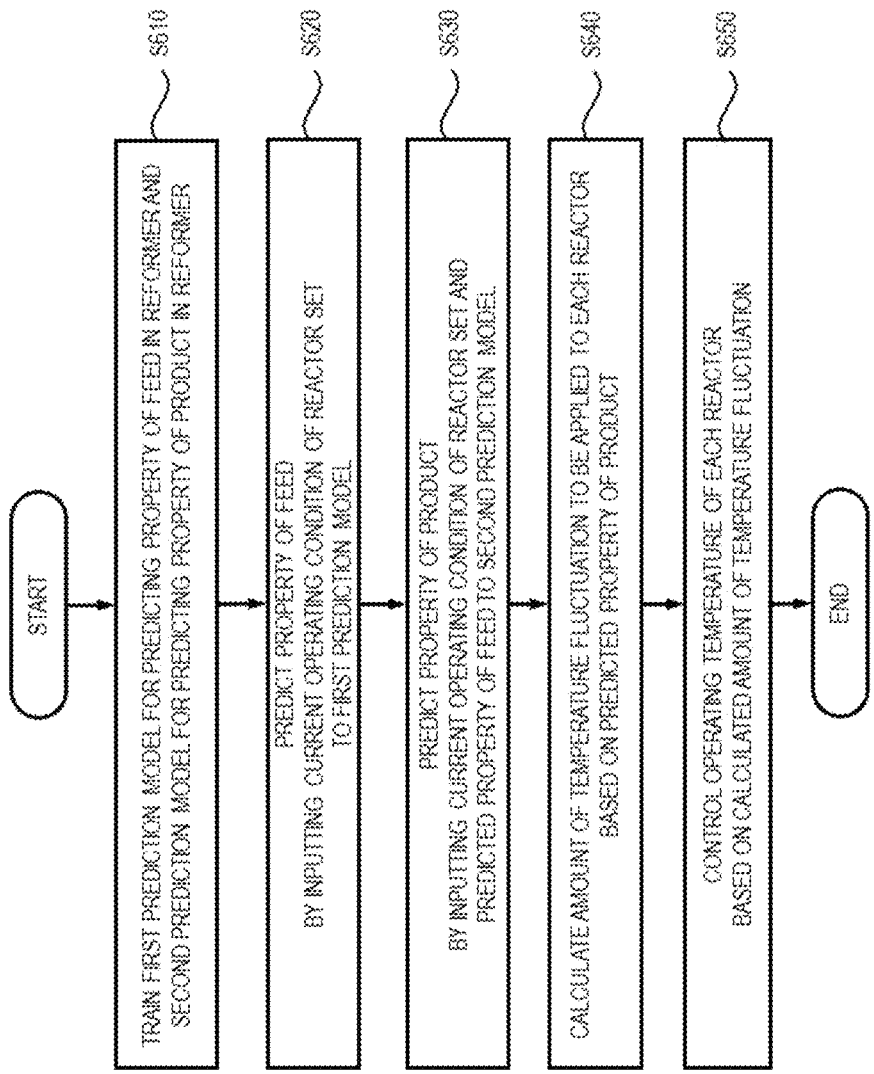
FIG. 7 is a flowchart illustrating a method of controlling a reactor in a reformer according to an embodiment of the present disclosure.

FIG. 7 is a flowchart illustrating a method of controlling a reactor in a reformer according to an embodiment of the present disclosure.

First, the first prediction model for predicting the properties of feed in the reformer and the second prediction model for predicting the properties of products in the reformer are each trained (S610). The first prediction model is trained by using, as the training data, the experimental values (e.g., the content of napthene in the feed and the content of paraffin in the feed) for the properties of feed and the operating conditions (e.g., the feed flow rate, the circulating gas flow rate, the hydrogen purity, the operating pressure, the operating temperature for each reactor, the inlet temperature and outlet temperature of each reactor, and the weighted average inlet temperature of the reactor) of the reactor set 210 when the reforming reaction is performed using the feed. The second prediction model is trained by using, as the training data, the experimental values for the properties of feed, the operating conditions of the reactor set 210 when the reforming reaction is performed using the feed, and the experimental values (e.g., the content of whole aromatics in the product, the content of whole paraffin in the product, the content of aromatic C6 in the product, the content of aromatic C7 in the product, the content of aromatic C8 in the product, and the content of aromatic C9 in the product) for the properties of product generated in the reactor set 210.

Thereafter, the feed component input to the reactor set 210 is predicted by inputting the current operating conditions of the reactor set 210 to the first prediction model (S620). Specifically, the content of napthene and the content of paraffin in the feed are each predicted. In this case, examples of the operating conditions of the reactor set 210 may include the feed flow rate, the circulating gas flow rate, the hydrogen purity, the operating pressure, the operating temperature for each reactor, the inlet and outlet temperatures of each reactor, and the weighted average inlet temperature of the reactor.

Thereafter, the current operating conditions of the reactor set 210 and the properties of feed predicted in operation S620 are input to the second prediction model to predict the component of product being produced in the reactor set 210 (S630). Specifically, the content of whole aromatics and the content of whole paraffin in the product are predicted. In this case, the second prediction model predicts the content of specific aromatic components in the product as well as the content of whole aromatics in the product, respectively. For example, the contents of aromatic C6, aromatic C7, aromatic C8, and aromatic C9 are each predicted.

Next, the amount of temperature fluctuation to be applied to each reactor is calculated as a control signal for controlling the operating temperature of each reactor based on the properties of product predicted by the second prediction model (S640).

Then, the operating temperature of each reactor is controlled based on the calculated amount of temperature fluctuation (S650).

Figure 8:
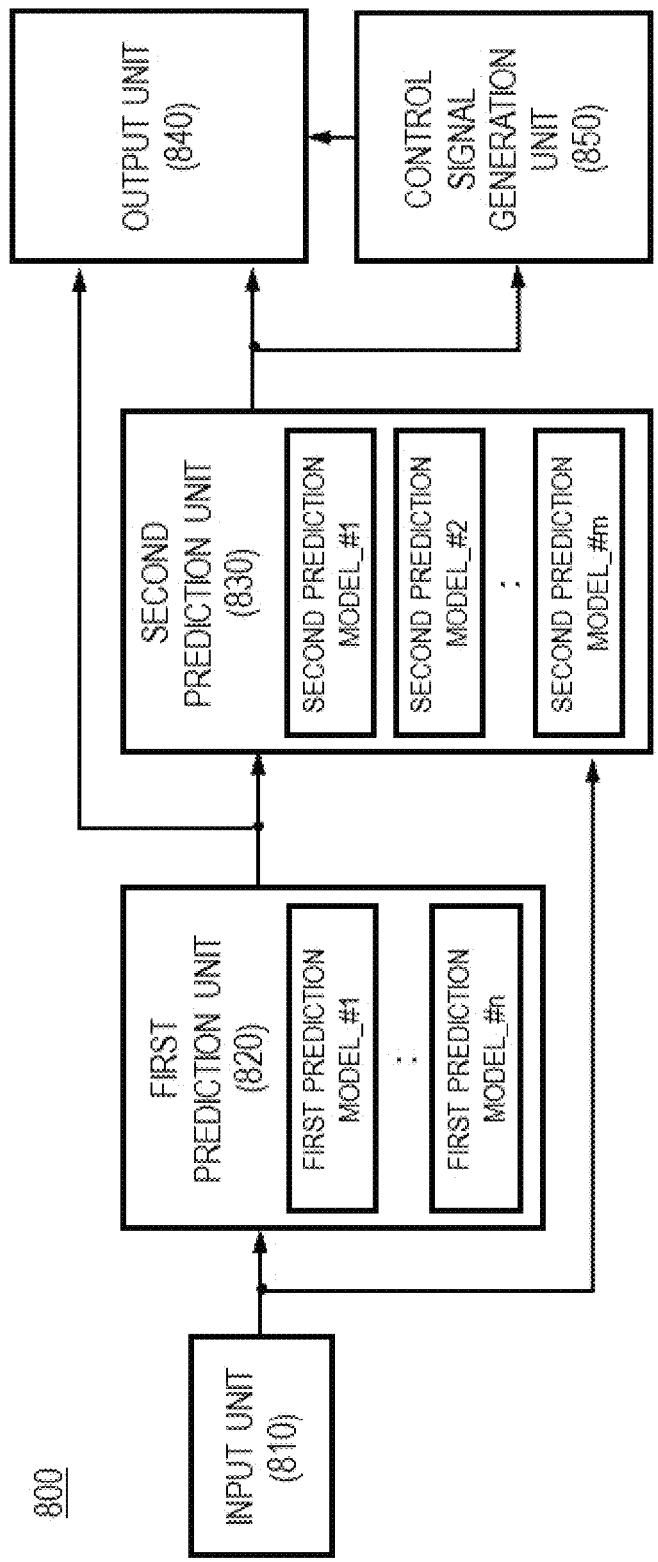
FIG. 8 is a diagram illustrating a configuration of an apparatus for controlling a reactor in a reformer according to another embodiment of the present disclosure.

FIG. 8 is a diagram illustrating a configuration of a reactor control apparatus 800 according to another embodiment of the present disclosure.

Referring to FIG. 8, the reactor control apparatus 800 includes an input unit 810, a first prediction unit 820, a second prediction unit 830, an output unit 840, and a control signal generation unit 850. The input unit 810, the first prediction unit 820, the second prediction unit 830, the output unit 840, and the control signal generation unit 850 correspond to the input unit 310, the first prediction unit 320, the second prediction unit 330, the output unit 340, and the control signal generation unit 350 of FIG. 3. Therefore, overlapping descriptions will be omitted, and differences will be mainly described.

The first prediction unit 820 includes n (e.g., 7) different first prediction models. The n first prediction models are each trained by using, as the training data, the experimental values for the properties of feed and the operating conditions of the reactor set when the reforming reaction is performed using the feed. Then, the first prediction model that outputs the prediction results with the highest accuracy among the trained first prediction models is selected.

Any one of the first prediction models may be automatically selected according to a result of analyzing the prediction results output from the plurality of first prediction models, or may be directly selected by the operator. The selected first prediction model may be activated, and the remaining unselected first prediction models may be deactivated. Therefore, after the training is completed, even if the current operating conditions of the reactor set input through the input unit 810 are each input to the n first prediction models, only the pre-selected first prediction model outputs the prediction results for the properties of feed.

The second prediction unit 830 includes m (e.g., 7) different second prediction models. The m second prediction models are each trained by using, as the training data, the experimental values for the properties of feed, the operating conditions of the reactor set when the reforming reaction is performed using the feed, and the experimental values for the properties of product generated in the reactor set. Then, the second prediction model that outputs the prediction results with the highest accuracy among the trained second prediction models is selected.

Any one of the second prediction models may be automatically selected according to a result of analyzing the prediction results output from the plurality of second prediction models, or may be directly selected by the operator. The selected second prediction model may be activated, and the remaining unselected second prediction models may be deactivated. Therefore, after the training is completed, even if the current operating conditions of the reactor set input through the input unit 810 and the prediction results output from the first prediction unit 820 are each input to the m second prediction models, only the previously selected second prediction model outputs the prediction results for the properties of product.

FIG. 9 is a flowchart illustrating a method of controlling a reactor in a reformer according to another embodiment of the present disclosure.

First, the plurality of first prediction models for predicting the properties of feed in the reformer and the plurality of second prediction models for predicting the properties of product in the reformer are each trained (S910). The plurality of first prediction models are trained by using, as the training data, the experimental values (e.g., the content of napthene in the feed and the content of paraffin in the feed) for the properties of feed and the operating conditions (e.g., the feed flow rate, the circulating gas flow rate, the hydrogen purity, the operating pressure, the operating temperature for each reactor, and the inlet temperature and outlet temperature of each reactor) of the reactor set 210 when the reforming reaction is performed using the feed. The plurality of second prediction models are trained by using, as the training data, the experimental values for the properties of feed, the operating conditions of the reactor set 210 when the reforming reaction is performed using the feed, and the experimental values (e.g., the content of whole aromatics in the product, the content of whole paraffin in the product, the content of aromatic C6 in the product, the content of aromatic C7 in the product, the content of aromatic C8 in the product, and the content of aromatic C9 in the product) for the properties of product generated in the reactor set.

When the training is completed, the first prediction model that outputs the prediction results with the highest accuracy among the plurality of first prediction models is selected. Similarly, the second prediction model that outputs the prediction results with the highest accuracy among the plurality of second prediction models is selected.

Thereafter, the current operating conditions of the reactor set are input to the first prediction model to predict the feed component input to the reactor set (S920). Specifically, the content of napthene and the content of paraffin in the feed are each predicted. In this case, examples of the operating conditions of the reactor set 210 may include the feed flow rate, the circulating gas flow rate, the hydrogen purity, the operating pressure, the operating temperature for each reactor, and the inlet and outlet temperatures of each reactor.

Thereafter, the current operating conditions of the reactor set and the properties of feed predicted in operation S920 are input to the second prediction model to predict the product components being produced in the reactor set (S930). Specifically, the content of whole aromatics and the content of whole paraffin in the product are predicted. In this case, the second prediction model predicts the content of whole aromatics in the product as well as the content of specific aromatic components in the product, respectively. For example, the contents of aromatic C6, aromatic C7, aromatic C8, and aromatic C9 are each predicted.

Next, the amount of temperature fluctuation to be applied to each reactor is calculated as a control signal for controlling the operating temperature of each reactor based on the properties of product predicted by the second prediction model (S940).

Then, the operating temperature of each reactor is controlled based on the calculated amount of temperature fluctuation (S950).

The embodiments of the present disclosure have been described above. Among the components constituting the reactor control devices 300 and 800 in the above-described embodiments, it may be understood that the first prediction units 320 and 820 and the second prediction units 330 and 830 are a software sensor that generates data by processing data.

In addition, although FIGS. 3 and 8 illustrate that the reactor control devices 300 and 800 are one physical device, this is only for convenience of understanding, and according to the embodiments, the reactor control devices 300 and 800 may be implemented as a system constituted by a plurality of computing devices. For example, one or more of the first prediction units 320 and 820 and the second prediction units 330 and 830 may be implemented as an independent computing device. In this case, each computing device may communicate via a network.

The computing device may include a storage for storing an application or computer program for executing a method of controlling a reactor in a reformer according to embodiments of the present disclosure, one or more processors that perform operations on the application or computer program, a memory that loads an application or computer program executed by the processor, a bus that provides a communication function between components of a computing device, and a network interface that supports wired/wireless Internet communication of the computing device Meanwhile, in addition to the above-described embodiments, the embodiments of the present disclosure may be implemented through a medium including computer-readable code/instructions for controlling at least one processing element of the above-described embodiments, for example, a computer-readable medium. The medium may correspond to a medium/media that enables storage and/or transmission of the computer-readable code.

The computer-readable code may be recorded on a medium as well as transmitted over the Internet. The medium may include, for example, a recording media such as magnetic storage media (e.g., ROM, floppy disk, hard disk, etc.) and an optical recording medium (e.g., CD-ROM, Blu-Ray, DVD), and transmission media such a carrier wave. Since the media may be a distributed network, the computer-readable code may be stored/transmitted and executed in a distributed manner. Furthermore, the processing element may include a processor or a computer processor as only one example, and the processing element may be distributed and/or included in one device.

Since properties of feed and products in a reformer are predicted and output in real time, it is possible for an operator to check changes in the properties of products due to change in operating conditions of the reactor in real time.

It is possible to control an operation of a reactor in real time based on predicted properties of products to maximize the content of aromatic components in the products.

Although embodiments of the present disclosure have been hereinabove described with reference to the accompanying drawings, those skilled in the art to which the present disclosure pertains will be able to understand that the present disclosure may be implemented in other specific forms without departing from the spirit or essential feature of the present disclosure. Therefore, it should be understood that the above-mentioned embodiments are exemplary in all aspects but are not limited thereto.

What is claimed is:

1. A method of controlling a reactor in a reformer, comprising the steps of:
    training a first prediction model for predicting properties of feed in a reformer and a second prediction model for predicting properties of products in the reformer;
    predicting the properties of feed being currently supplied to a reactor set in real time by allowing a first prediction unit including the trained first prediction model to receive a current operating condition of the reactor set in the reformer;
    predicting the properties of products being produced in the reactor set in real time by allowing a second prediction unit including the trained second prediction model to receive the current operating condition and the predicted properties of feed;
    calculating a amount of temperature fluctuation to be applied to each reactor as a control signal for controlling each of the reactors of the reactor set based on the predicted properties of products; and
    controlling an operating temperature of each of the reactors based on the calculated amount of temperature fluctuation.

2. The method of claim 1, wherein the first prediction model is trained by using, as training data, experimental values for the properties of feed supplied to the reactor set, and using the operating condition of the reactor set when a reforming reaction is performed using the feed.

3. The method of claim 1, wherein the second prediction model is trained by using, as training data, experimental values for the properties of feed supplied to the reactor set, the operating condition of the reactor set when a reforming reaction is performed using the feed, and experimental values for the properties of products produced in the reactor set.

4. The method of claim 1, wherein the first prediction unit predicts a content of napthene and a content of paraffin contained in the feed being currently supplied to the reactor set, respectively.

5. The method of claim 1, wherein the second prediction unit predicts a content of whole aromatics and a content of paraffin contained in the product being produced in the reactor set, respectively, and predicts a content of each component of the whole aromatics.

6. The method of claim 1, wherein the current operating condition includes one or more of a feed flow rate, a circulating gas flow rate, hydrogen purity, an operating pressure, an operating temperature for each reactor, and inlet and outlet temperatures of each reactor that are supplied to the reactor set.

7. An apparatus for controlling a reactor in a reformer, comprising:
    a first prediction unit configured to predict properties of feed being currently supplied to a reactor set in real time by using a pre-trained first prediction model when a current operating condition of the reactor set in the reformer is input;
    a second prediction unit configured to predict properties of products being produced in the reactor set in real time by using a pre-trained second prediction model when the current operating condition and the predicted properties of feed are input; and
    a control signal generation unit configured to calculate a amount of temperature fluctuation to be applied to each reactor as a control signal for controlling each of the reactors of the reactor set based on the predicted properties of products,
    wherein the operating temperature of each of the reactors is controlled based on the calculated amount of temperature fluctuation.

8. The apparatus of claim 7, wherein the first prediction model is trained by using, as training data, experimental values for the properties of feed supplied to the reactor set, and the operating condition of the reactor set when a reforming reaction is performed using the feed.

9. The apparatus of claim 7, wherein the second prediction model is trained by using, as training data, experimental values for the properties of feed supplied to the reactor set, the operating condition of the reactor set when a reforming reaction is performed using the feed, and experimental values for the properties of products produced in the reactor set.

10. The apparatus of claim 7, wherein the first prediction unit predicts a content of napthene and a content of paraffin contained in the feed being currently supplied to the reactor set, respectively.

11. The apparatus of claim 7, wherein the second prediction unit predicts a content of whole aromatics and a content of paraffin contained in the product being produced in the reactor set, respectively, and predicts a content of each component of the whole aromatics.

12. The apparatus of claim 7, wherein the current operating condition includes one or more of a feed flow rate, a circulating gas flow rate, hydrogen purity, an operating pressure, an operating temperature for each reactor, and inlet and outlet temperatures of each reactor that are supplied to the reactor set.

13. A non-transitory computer-readable recording medium in which a program for performing the method of controlling a reactor in a reformer of claim 1 is recorded.

14. An application for a terminal device that is installed in a terminal device which is hardware to execute the method of controlling a reactor in a reformer of claim 1, and is stored in a non-transitory computer-readable transitory recording medium.

* * * * *